United States Patent [19]

Takamatsu et al.

[11] Patent Number: 5,015,055
[45] Date of Patent: May 14, 1991

[54] POLARIZATION COUPLER

[75] Inventors: Hisashi Takamatsu, Kawasaki; Norihisa Naganuma, Yokohama; Kenichi Abe, Yamato, all of Japan

[73] Assignee: Fujitsu Limited, Kanagawa, Japan

[21] Appl. No.: 539,220

[22] Filed: Jun. 18, 1990

[30] Foreign Application Priority Data

Jun. 19, 1989 [JP] Japan .................................. 1-154661

[51] Int. Cl.⁵ .............................................. G02B 6/26
[52] U.S. Cl. ................................................. 350/96.15
[58] Field of Search ............... 350/96.15, 96.16, 96.17, 350/96.20, 96.21, 320

[56] References Cited

U.S. PATENT DOCUMENTS 4,606,605 8/1986 Ashkin et al. ..................... 350/96.31
4,737,005 4/1988 Burns et al. ....................... 350/96.15
4,801,189 1/1989 Shaw et al. ........................ 350/96.15
4,917,449 4/1990 Granestrand ...................... 350/96.14

Primary Examiner—Frank Gonzalez
Attorney, Agent, or Firm—Staas & Halsey

[57] ABSTRACT

A polarization coupler in which a polarization maintaining fiber is employed and a process of producing such polarization coupler are disclosed. Where the polarization coupler is used, beams of light from two laser diodes can be introduced into a single optical fiber and light for the monitoring can be split from a main signal output. Since minimum components required to realize the function are a rotator, a birefringent plate and two or three polarization maintaining fibers, the polarization coupler is superior in operability in production and is suitable for miniaturization. The branching ratio of light for monitoring can be adjusted by adjustment of the angle of rotation of light by the rotator.

11 Claims, 5 Drawing Sheets

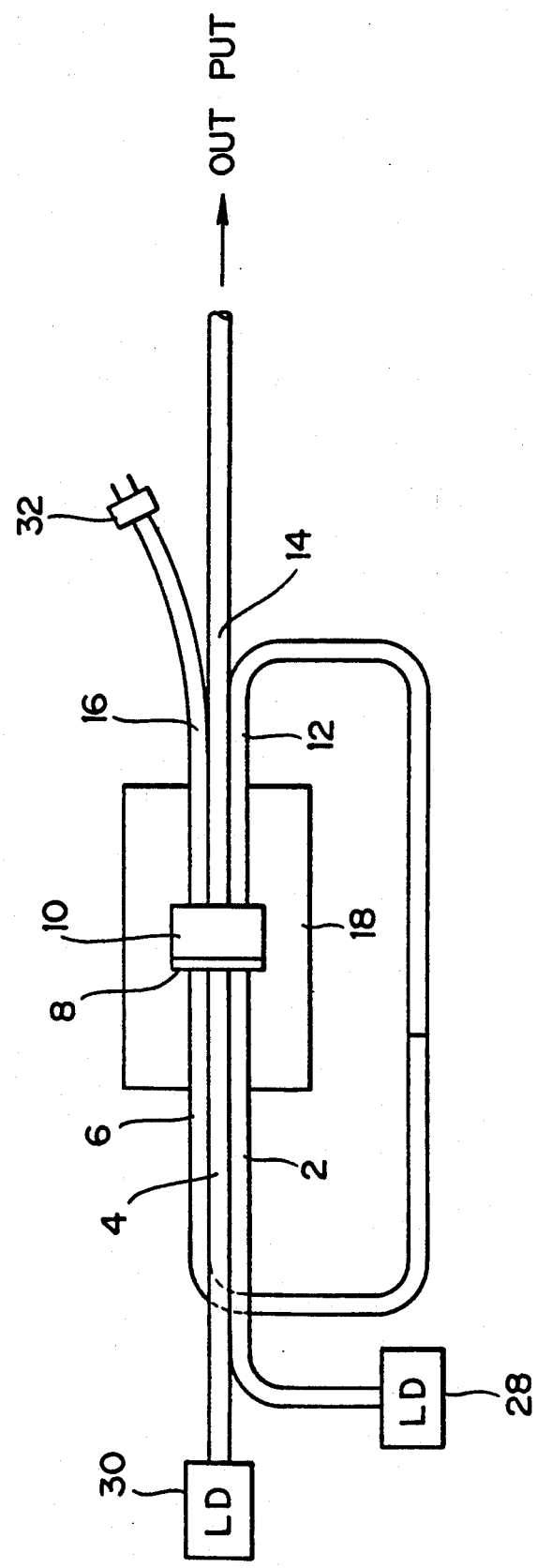

POLARIZATION COUPLER

BACKGROUND OF THE INVENTION

This invention relates to a polarization coupler for use for the introduction of light from two laser diodes into a single optical fiber or the like and also to a process of producing such polarization coupler.

In order to build up an optical fiber communication system of a high reliability, it is effective to duplex a light source of a laser diode or the like in an optical transmitter. In this instance, the two light sources are constructed in advance such that output beams of light therefrom may be introduced into an optical fiber, and at an initial stage after starting of operation of the system, only one of the two light sources is used, but after the light source fails, the other light source is alternatively used to prevent a possible system down. A polarization coupler is used to introduce, in a highly reliable system of the type mentioned, beams of polarized light from two light sources (linearly polarized light or elliptically polarized light approximate to linearly polarized light) into a common optical fiber. By the way, in an optical transmitter, part of an optical output is sometimes split and power of the thus split light is monitored in order to watch, for example, deterioration of a light source with the passage of time. A polarization coupler suitable for such monitoring is thus demanded.

Conventionally, a polarization coupler which includes a polarizing prism and a beam splitter having a branching ratio free from polarization dependency is known as a polarization coupler which allows such monitoring as described above. In an optical transmitter which includes a polarization coupler of the type just mentioned, beams of light emitted from, for example, two laser diodes and having polarization planes perpendicular to each other are collimated by a lens and introduced into a same light path by way of a polarizing prism so that they are introduced into an optical fiber by means of a beam splitter having a branching ratio free from polarization dependency and a condensing lens. Monitoring for the light intensity is effected for light split by the beam splitter.

Since a conventional polarization coupler is constituted using a polarizing prism for the composition of beams of light (linearly polarized light in ordinary cases) from two light sources while using a beam splitter having a branching ratio free from polarization dependency for the monitoring and besides requires a lens for forming a parallel light beam system in this manner, there is a limitation in miniaturization of the device.

Further, since very accurate adjustment in optical axis is required in assembly, the operability in production is not high.

In addition, since the branching ratio between main signal light and light for the monitoring is determined decisively by a branching ratio of the beam splitter, it cannot be varied readily.

SUMMARY OF THE INVENTION

It is an object of the present invention to provide a polarization coupler which is suitable for the miniaturization and high in operability in production and can be set readily to a desired branching ratio in monitoring.

According to an aspect of the present invention, there is provided a polarization coupler which comprises, as shown in FIGS. 1A and 1B in which basic construction of the polarization coupler is shown, a first polarization maintaining fiber 2 for transmitting first input light therethrough while maintaining a polarization plane of the same, a second polarization maintaining fiber 4 having a geometrical center axis disposed in parallel to a geometrical center axis of said first polarization maintaining fiber 2 for transmitting therethrough second input light having a polarization plane perpendicular to the polarization plane of the first input light while maintaining the polarization plane of the second input light; a third polarization maintaining fiber 6 having a geometrical center axis disposed in parallel to the geometrical center axes of said first and second polarization maintaining fibers 2 and 4 on a plane including the geometrical center axes of said first and second polarization maintaining fibers 2 and 4; a rotator 8 for rotating the polarization planes of light outputted from said first, second and third polarization maintaining fibers 2, 4 and 6 by a predetermined angle in a same direction; a birefringent plate 10 for separating light having polarization planes rotated by said rotator 8 individually into ordinary rays of light and extraordinary rays of light; a fourth polarization maintaining fiber 12 having a geometrical center axis disposed on an extension line of the geometrical center axis of said first polarization maintaining fiber 2 for introducing the ordinary ray of light originating from the first input light into said third polarization maintaining fiber 6 while maintaining the polarization plane of the ordinary ray of light; a fifth polarization maintaining fiber 14 having a geometrical center axis disposed on an extension line of the geometrical center axis of said second polarization maintaining fiber 4 for transmitting therethrough the extraordinary ray of light originating from the first input light and the ordinary ray of light originating from the second input light while maintaining the polarization planes of the same; and a sixth polarization maintaining fiber 16 having a geometrical center axis disposed on an extension line of the geometrical center axis of said third polarization maintaining fiber 6 for transmitting therethrough the extraordinary ray of light originating from the second input light and the ordinary ray of light originating from light outputted from said third polarization maintaining fiber 6 while maintaining the polarization planes of the same.

With the construction, when the first and second fibers 2 and 4 are connected to two light sources, main signal light can be extracted from the fifth fiber 14 while light for the monitoring can be extracted from the sixth fiber 16. The basic construction described above can be realized readily by mounting said first to sixth fibers 2, 4, 6, 12, 14 and 16, said rotator 8 and said birefringent plate 10 on a substrate.

Where said first to third fibers 2, 4 and 6 are held in a closely contacting relationship on said rotator 8 while said rotator 8 is held in a closely contacting relationship on said birefringent plate 10 and said fourth to sixth fibers 12, 14 and 16 are held in a closely contacting relationship with said birefringent plate 10, the loss of light by the polarization coupler is restricted low.

Where said first and third fibers 2 and 6 are held in a closely contacting relationship with said second fiber 4 while said fourth and sixth fibers 12 and 16 are held in a closely contacting relationship with said fifth coupler 14, the separation angle between an ordinary ray of light and an extraordinary ray of light with respect to a unit thickness of the birefringent plate 10, or alternatively the thickness of the birefringent plate 10 with respect to a unit separation angle between an ordinary ray of light and an extraordinary ray of light can be reduced, and consequently, the loss of the polarization coupler can be restricted low.

Preferably, each of some or all of said first to sixth fibers 2, 4, 6, 12, 14 and 16, for example, each of the first, second, fifth and sixth fibers 2, 4, 14 and 16, is formed from a birefringent fiber which is different between a propagation coefficient for light of the $HE_x$ mode and a propagation coefficient for light of the $HE_y$ mode.

The birefringent fiber may be of the stress inducing type which has a cross section in which a pair of stress applying portions are provided in a symmetrical relationship on the opposite sides in a clad of a core or alternatively of the stress inducing type which has a cross section in which an elliptical stress applying portion is provided in a clad around a core.

Preferably, the predetermined angle (the angle of rotation of light by the rotator 8) is set such that the power of the extraordinary ray of light which is transmitted through said fifth fiber 14 may be higher than the power of the ordinary ray of light which is transmitted through said fourth fiber 12 and the power of the ordinary ray of light which is transmitted through said fifth fiber 14 may be higher than the power of the extraordinary ray of light which is transmitted through said sixth fiber 16.

Setting of the predetermined angle may be effected by setting of the orientation of an optical axis of a half-wave plate which is employed as the rotator 8.

Alternatively, setting of the predetermined angle may be effected by setting of a predetermined magnetic field which is applied to a Faraday rotator which is employed as the rotator 8.

According to another aspect of the present invention, there is provided a process of producing a polarization coupler which comprises a first step of mounting a first mother fiber which is to later make first and fourth polarization maintaining fibers, a second mother fiber which is to make second and fifth polarization maintaining fibers and a third mother fiber which is to make third and sixth polarization maintaining fibers onto a substrate such that the maintaining polarization planes of said first to third mother fibers may extend in parallel or perpendicularly to each other and said first to third mother fibers may extend in parallel to each other; a second step of cutting said first to third mother fibers mounted on said substrate with a predetermined cutting width such that the cutting faces thereof may be positioned in the same plane, thereby dividing said first mother fiber into the first and fourth polarization maintaining fibers, said second mother fiber into the second and fifth polarization maintaining fibers and said third mother fiber into the third and sixth polarization maintaining fibers; a third step of inserting a rotator and a birefringent plate between said first, second and third polarization maintaining fibers and said fourth, fifth and sixth polarization maintaining fibers such that said rotator may be positioned adjacent said first, second and third polarization maintaining fibers; and a fourth step of connecting said third polarization maintaining fiber and said fourth polarization maintaining fiber to each other such that the maintaining polarization planes thereof may extend in parallel or perpendicularly to each other.

The above and other features and advantages of the present invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIG. 7 is a schematic illustration showing a principal portion of an optical transmitter which is constructed using a polarization coupler of the present invention.

DESCRIPTION OF THE PREFERRED EMBODIMENTS

Figure 1A:
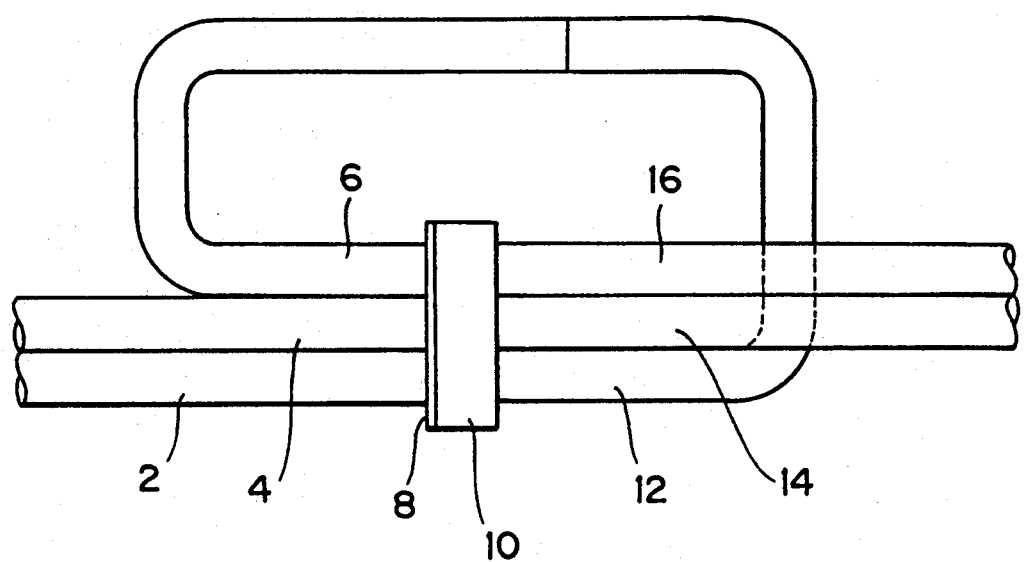
FIG. 1A is a plan view of a polarization coupler showing basic construction of the present invention.
Figure 1B:
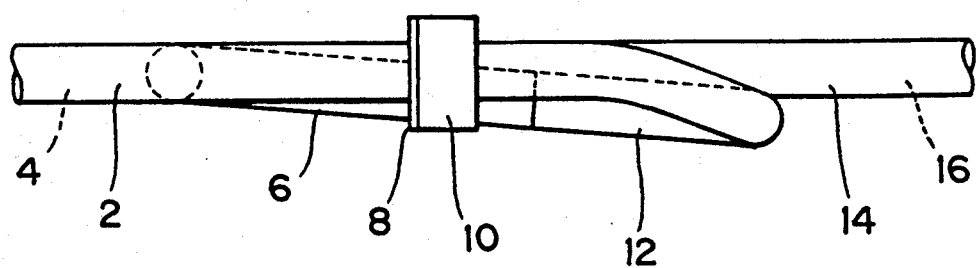
FIG. 1B is a front elevational view of the polarization coupler of FIG. 1A.
Figure 2:
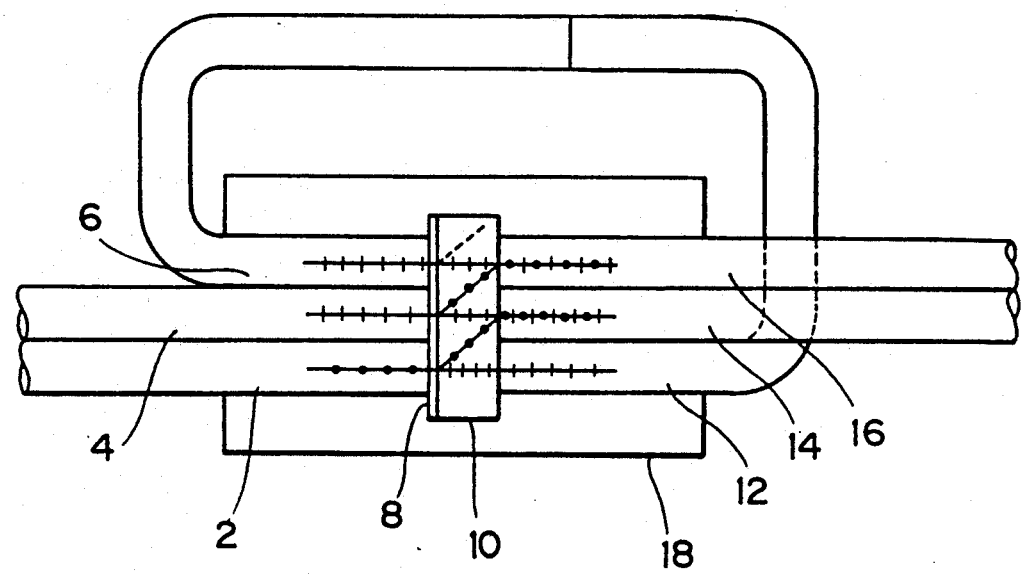
FIG. 2 is a plan view of a polarization coupler showing a preferred embodiment of the present invention.

Referring first to FIG. 2, there is shown a polarization coupler according to the present invention wherein various components are secured to a substrate 18 made of quartz or the like and having a flat surface thereon. Where first to sixth polarization maintaining fibers 2, 4, 6, 12, 14 and 16 are secured to the substrate 18 in this manner, it is easy to position the geometrical center axes of the individual fibers on a same plane. A function of the polarization coupler will be described subsequently with reference to FIG. 2.

Beams of light which are transmitted by way of the first and second fibers 2 and 4 from two light sources not shown have polarization planes perpendicular to each other. It is assumed now that the polarization plane of light transmitted by way of the first fiber 2 extends perpendicularly to the plane of FIG. 2 while the polarization plane of light transmitted by way of the second fiber 4 extends in parallel to the plane of FIG. 2. In this instance, the orientation of the optical axis of the birefringent plate 10 is set such that the polarization plane of an ordinary ray of light therethrough may extend in parallel to the plane of FIG. 2 while the polarization plane of an extraordinary ray of light extends perpendicularly to the plane of FIG. 2.

If beams of light are introduced into the rotator 8 from the first and second fibers 2 and 4, then the polarization planes of them are rotated by a predetermined angle in the same direction, and then the beams of light having the thus rotated polarization planes are introduced into the birefringent plate 10. If a beam of light having a polarization plane which extends neither perpendicularly nor in parallel to the plane of FIG. 2 is introduced into the birefringent plate 10, then it is split into an ordinary ray of light and an extraordinary ray of light, and the thus split rays of light are normally transmitted in different directions such that the ordinary ray of light advances straightforwardly. Accordingly, the ordinary rays of light from the birefringent plate 10 can be introduced into the fourth and fifth fibers 12 and 14 disposed in a coaxial relationship with the first and second fibers 2 and 4, respectively. Meanwhile, if the optical axis of the birefringent plate 10 is set in a specific manner, then an extraordinary ray of light can be transmitted in a direction inclined by a predetermined angle with respect to the geometrical axis of each fiber on a plane including the geometrical axes. Accordingly, if the thickness of the birefringent plate 10 is set in a specific manner, then the extraordinary ray of light from the first fiber 2 can be introduced into the fifth fiber 14 while the extraordinary ray of light from the second fiber 4 can be introduced into the sixth fiber 16. On the other hand, the ordinary ray of light introduced into the fourth fiber 12 is then introduced into the third fiber 6 while maintaining its polarization plane, whereafter it passes through the rotator 8 and then through the birefringent plate 10 and is then introduced into the sixth fiber 16. Accordingly, light introduced into the fifth fiber 14 can be extracted as a main signal output while light introduced into the sixth fiber 16 can be extracted for the monitoring.

If it is assumed that the angle of rotation of the polarization plane (the aforementioned predetermined angle) by the rotator 8 is set such that, for example, 5% of light transmitted by way of the first fiber 2 (first input light) may be introduced as an ordinary ray of light into the fourth fiber 12 ignoring a loss, the remaining 95% of the light is introduced as an extraordinary ray of light into the fifth fiber 14. In this instance, since the polarization plane of the light transmitted by way of the second fiber 4 (second input light) extends perpendicularly to the polarization plane of the first input light, 5% of the second input light is introduced as an extraordinary ray of light into the sixth fiber 16 while the remaining 95% is introduced as an ordinary ray of light into the fifth fiber 14. Accordingly, it is possible to combine 95% of the first and second input light and introduce the same into the fifth fiber 14. It is to be noted that, as for light for the monitoring to be introduced into the sixth fiber 16, while the extraordinary ray of light originating from the second input light is 5% of the original second input light, the ordinary ray of light originating from the first input light is 4.75% of the original first input light because second 5% is removed as an extraordinary ray of light from 5% of the original fist input light. Since the difference is very small, however, it does not make any essential matter in monitoring powers of the first and second input light.

Figure 3A:
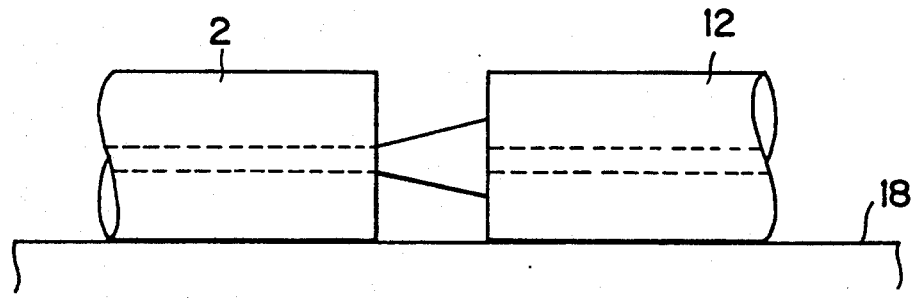
FIGS. 3A and 3B are schematic views illustrating an effect arising from the structure of the embodiment of the present invention shown in FIG. 2 wherein a polarization maintaining fiber, a rotator and a birefringent plate are held in a closely contacting relationship with each other.

In the present embodiment, the first, second and third fibers 2, 4 and 6 are held in a closely contacting relationship on the rotator 8 which is in turn held in a closely contacting relationship on the birefringent plate 10 while the fourth, fifth and sixth fibers 12, 14 and 16 are held in a closely contacting relationship on the birefringent plate 10. An effect achieved by such construction will be described below with reference to FIGS. 3A and 3B. Where there is a spacing between the first and fourth fibers 2 and 12 as shown in FIG. 3A, light radiated from an end face of a core of the first fiber 2 is expanded significantly due to a difference between a refractive index of the core of the first fiber 2 and another refractive index of air, and consequently, a great loss is caused when the light is introduced into a core of the fourth fiber 12 by way of and end face of the core.

Figure 3B:
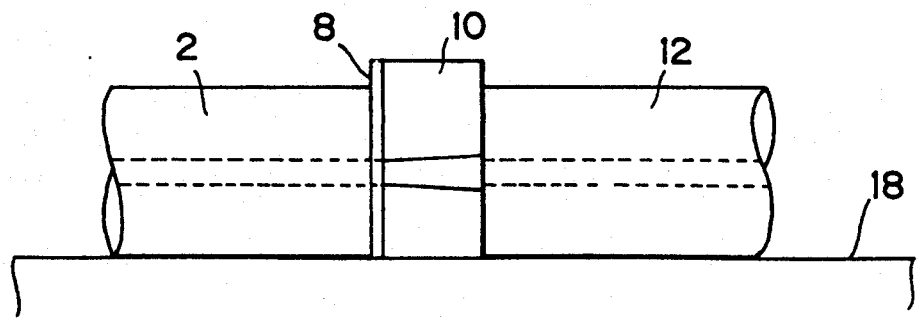

On the other hand, where the rotator 8 and the birefringent plate 10 held in a closely contacting relationship with each other are held in a closely contacting relationship with end faces of fibers as shown in FIG. 3B, such expansion of a beam of light is caused little because normally the refractive indices of the rotator and the birefringent plate are not different by a great amount from the refractive index of the cores, and consequently, an optical coupling which is low in loss can be obtained. Accordingly, where the construction of the present embodiment is employed, a polarization coupler which is reduced in loss can be provided comparing with an alternative arrangement wherein various members are disposed such that an air gap may be provided between the rotator 8 and the first, second and third fibers 2, 4 and 6 and/or between the birefringent plate 10 and the fourth, fifth and sixth fibers 12, 14 and 16.

In the present embodiment, the first and third fibers 2 and 6 are held in a closely contacting relationship with the second fiber 4 while the fourth and sixth fibers 12 and 16 are held in a closely contacting relationship with the fifth fiber 14 as shown in FIG. 2. With the construction, since the geometrical center axes of the individual fibers can be disposed proximately to each other, if the separation angle of the birefringent plate 10 between an ordinary ray of light and an extraordinary ray of light is fixed, then the thickness of the birefringent plate 10 can be reduced, but on the contrary if the thickness of the birefringent plate 10 is fixed, then the separation angle between an ordinary ray of light and an extraordinary ray of light can be reduced. Consequently, the polarization coupler can be reduced in loss.

The first to sixth fibers 2, 4, 6, 12, 14 and 16 may each be formed from a birefringent fiber which has different propagation coefficients for light of a $HE_x$ mode and for light of a $HE_y$ mode. Here, the $HE_x$ mode is that one of $HE_{11}$ modes, which can be transmitted through a single mode fiber, which has an electric field in an x-axis direction perpendicular to the transmitting direction of light while the $HE_y$ mode is that one of the $HE_{11}$ modes which has an electric field in a y-axis direction perpendicular to the transmitting direction of light and also to the x-axis direction. Since the first to fourth fibers 2, 4, 6 and 12 are required to allow transmission therethrough only of a polarized light component having a predetermined polarization plane while the fifth and sixth fibers 14 and 16 are required to allow transmission therethrough of two polarized light components having perpendicular polarization planes, the first to fourth fibers 2, 4, 6 and 12 may otherwise be formed each from a polarization maintaining fiber which is designed such that it may present significantly different transmission losses with light of the $HE_x$ mode and the $HE_y$ mode, or in other words, which is designed such that light of only one mode may be transmitted therein.

Figure 4:
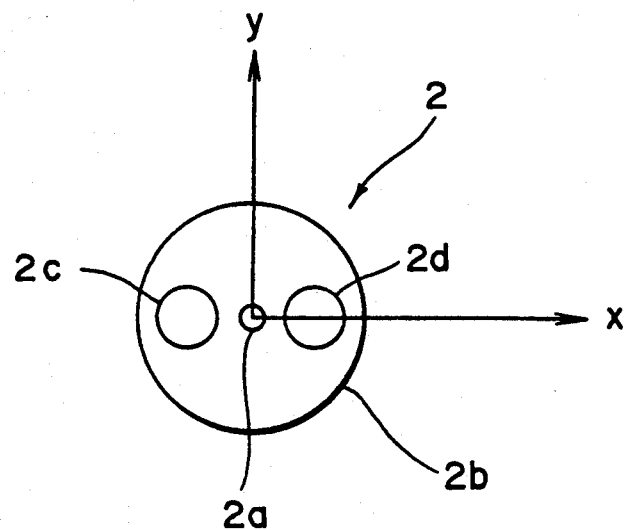
FIG. 4 is a diagrammatic view illustrating a birefringent fiber which can be used as a polarization maintaining fiber.

An example of construction of a birefringent fiber will be described with reference to FIG. 4 in which construction of an end face of the first fiber 2 is shown by way of an example. The birefringent fiber shown is of the stress inducing type wherein it has, as viewed in section, a pair of stress applying portions 2c and 2d provided in a symmetrical relationship on the opposite sides in a clad 2b of a core 2a. The stress applying portions 2c and 2d are formed from a material having a different coefficient of linear expansion from that of the clad 2b. With the construction, since the core 2a is provided with different stresses in the x-axis direction in which the core 2a and the stress applying portions 2c and 2d extend and the y-axis direction perpendicular to the x-axis direction, the core 2a has some anisotropy in refractive index, and consequently, the birefringent fiber can maintain a polarization plane of light of a particular mode. In other words, linearly polarized light having a polarization plane parallel to the x-axis or linearly polarized light having another polarization plane parallel to the y-axis can be transmitted in the birefringent fiber without changing the polarization condition.

Figure 5:
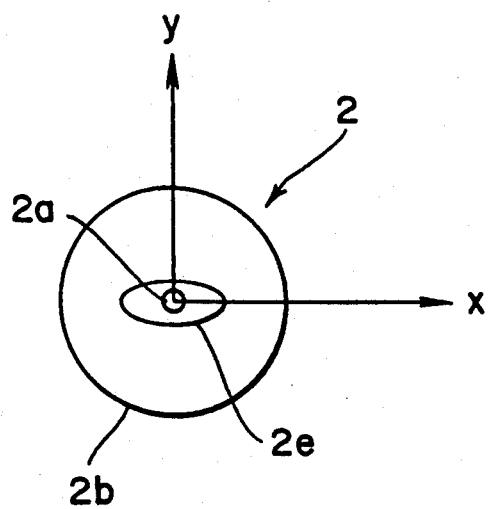
FIG. 5 is a similar view but illustrating another birefringent fiber which can be used as a polarization maintaining fiber.

Referring now to FIG. 5, there is shown another example of construction of a birefringent fiber. In the present example, a stress applying portion 2e having a substantially elliptical section is provided in a clad 2b around a core 2a such that the major axis of the ellipse of the section thereof may be positioned on the x-axis while the minor axis is positioned on the y-axis. Also with the construction, the core 2a is provided with some birefringence and consequently can maintain a polarization plane of light of a particular mode.

A half-wave plate may be employed for the rotator 8. In this instance, setting of the angle of rotation (predetermined angle) can be achieved by setting of the orientation of the optical axis of the half-wave plate. The rotator 8 may otherwise be constituted from a Faraday rotator to which a predetermined magnetic field is applied. In this instance, setting of the angle of rotation can be achieved by setting of the predetermined magnetic field. According to the present invention, the branching ratio of light for the monitoring with respect to a main signal output can be adjusted readily by arbitrarily setting the angle of rotation in this manner.

By the way, the power of light required for the monitoring is generally low. Accordingly, in order to assure a sufficiently high power of a main signal output, the angle of rotation of light by the rotator 8 is preferably set such that the power of an extraordinary ray of light which is transmitted in the fifth fiber 14 is higher than the power of an ordinary ray of light which is transmitted in the fourth fiber 12 while the power of an extraordinary ray of light which is transmitted in the fifth fiber 14 is higher than the power of an ordinary ray of light which is transmitted in the sixth fiber 16.

Figure 6A:
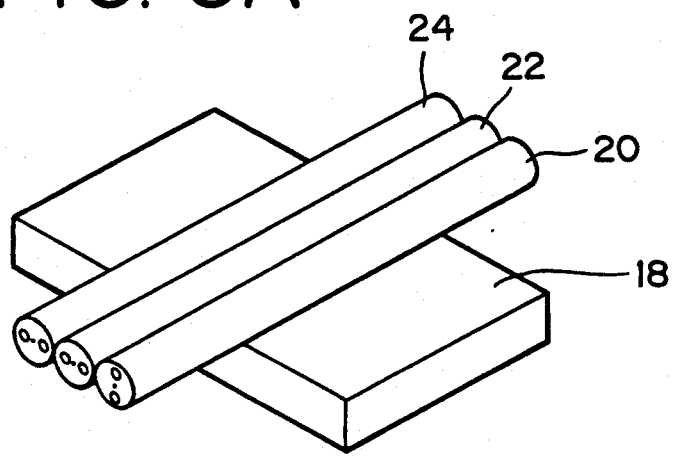
FIGS. 6A, 6B and 6C are schematic views showing different steps of a process of producing a polarization coupler according to the present invention.

Different steps of a process of producing a polarization coupler will be described subsequently with reference to FIGS. 6A, 6B and 6C. First, a first mother fiber 20 which is to later make the first and fourth fibers 2 and 12, a second mother fiber 22 which is to make the second and fifth fibers 4 and 14 and a third mother fiber 24 which is to make the third and sixth fibers 6 and 16 are fixed to a substrate 18 in the form of a flat plate made of quartz glass or the like as shown in FIG. 6A using, for example, a bonding agent. They may otherwise be fixed by soldering to a substrate which is plated in advance with gold on the fixing face thereof. In the present example, the second mother fiber 22 is held in a closely contacting relationship with the first and third mother fibers 20 and 24 on the substrate 18. The mother fibers 20, 22 and 24 have maintaining polarization planes (polarization planes of linearly polarized light transmitted while being maintained) which extend in parallel or perpendicularly to each other. In the present example, the first mother fiber 20 is disposed such that the x-axis thereof in FIG. 4 extends perpendicularly to the fixing surface of the substrate while the y-axis extends in parallel to the fixing surface, and the second and third mother fibers 22 and 24 are disposd such that the x-axes thereof extend in parallel to the substrate fixing surface while the y-axes extend perpendicularly to the substrate fixing surface.

Figure 6B:
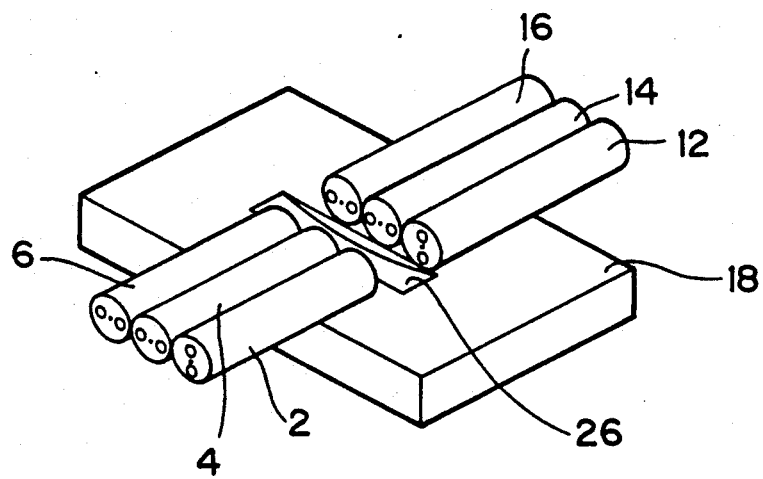

Subsequently, the mother fibers 20, 22 and 24 secured to the substrate 18 are cut in a predetermined cutting width using a cutting saw or the like such that the opposing cut faces thereof may be positioned in the same plane as shown in FIG. 6B, thereby dividing the first mother fiber 20 into first and fourth fibers 2 and 12, the second mother fiber 22 into second and fifth fibers 4 and 14 and the third mother fiber 24 into third and sixth fibers 6 and 16. In this instance, a groove or slit 26 may be formed on the substrate 18 in a shape in accordance with a driving radius of the cutting saw due to a dispersion or the like in an operation for the production, but there will be no trouble with such groove 26.

Figure 6C:
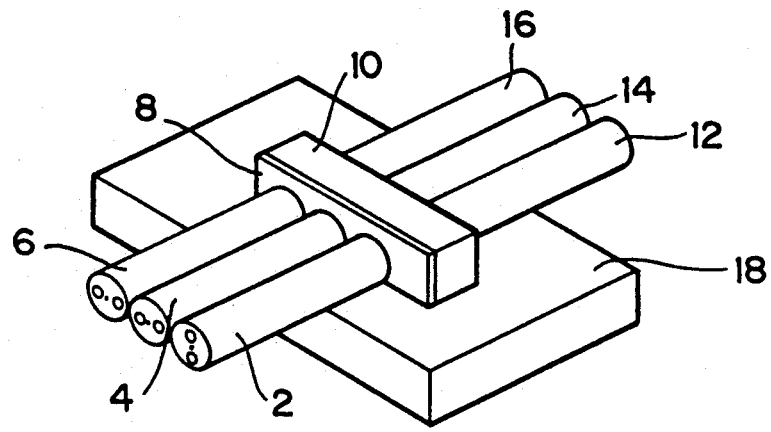

After then, a rotator 8 and a birefringent plate 10 which are integrated in advance with each other using an optical bonding agent or the like are inserted between the first, second and third fibers 2, 4 and 6 and the fourth, fifth and sixth fibers 12, 14 and 16 and are secured to the latter by means of an optical bonding agent or the like as seen in FIG. 6C.

Finally, the third fiber 6 and the fourth fiber 12 are adhered to each other, for example, by fusion such that the maintaining polarization planes thereof may extend in parallel or perpendicularly to each other. Confirmation of a maintaining polarization plane of a fiber can be effected by irradiating a beam of visible laser upon the fiber from sidewardly to confirm a stress applying portion of the fiber.

According to the present invention, since formation of a parallel light beam system is not required and hence adjustment of an optical axis of a parallel light beam system is not required either, a polarization coupler can be provided which is high in operability in production and is suitable for miniaturization. Further, since a possible increase in loss arising from formation of a parallel light beam system is eliminated, a polarization coupler can be provided which is low in loss.

Referring now to FIG. 7, there is shown construction of a main portion of an optical transmitter to which a polarization coupler of the present invention is applied. Reference numeral 28 denotes a laser diode connected to the first fiber 2, 30 another laser diode connected to the second fiber 4, and 32 a monitoring photodiode connected to the sixth fiber 16. According to the construction, light from either of the laser diodes 28 and 30 can be outputted by way of the fifth fiber 14. Accordingly, the reliability of the optical transmitter by the duplicating of the light source can be improved. Further, since optical outputs of the laser diodes 28 and 30 can be split at substantially equal branching ratios from a main signal route to detect powers thereof, a deterioration of an operating laser diode with the passage of time can be watched on the on-line basis.

While the present invention is described in connection with the particular embodiments thereof hereinabove, the present invention is not limited to such details of the embodiments described above. For example, while in the preferred embodiments shown in the drawings the third and fourth fibers 6 and 12 are produced from different mother fibers, the first and third mother fibers may otherwise be made common to omit connection of the third and fourth fibers 6 and 12 by fusion. Accordingly, the preferred embodiments described in the specification are only illustrative but not restrictive. The scope of the invention is defined by the appended claims, and all possible modifications and alterations which come within a scope of equivalency of the claims remain in the scope of the present invention.

What is claimed is:

1. A polarization coupler, comprising:
a first polarization maintaining fiber for transmitting first input light therethrough while maintaining a polarization plane of the same;
a second polarization maintaining fiber having a geometrical center axis disposed in parallel to a geometrical center axis of said first polarization maintaining fiber for transmitting therethrough second input light having a polarization plane perpendicular to the polarization plane of the first input light while maintaining the polarization plane of the second input light;
a third polarization maintaining fiber having a geometrical center axis disposed in parallel to the geometrical center axes of said first and second polarization maintaining fibers on a plane including the geometrical center axes of said first and second polarization maintaining fibers:
a rotator for rotating the polarization planes of light outputted from said first, second and third polarization maintaining fibers by a predetermined angle in a same direction:
a birefringent plate for separating light having polarization planes rotated by said rotator individually into ordinary rays of light and extraordinary rays of light;
a fourth polarization maintaining fiber having a geometrical center axis disposed on an extension line of the geometrical center axis of said first polarization maintaining fiber for introducing the ordinary ray of light originating from the first input light into said third polarization maintaining fiber while maintaining the polarization plane of the ordinary ray of light;
a fifth polarization maintaining fiber having a geometrical center axis disposed on an extension line of the geometrical center axis of said second polarization maintaining fiber for transmitting therethrough the extraordinary ray of light originating from the first input light and the ordinary ray of light originating from the second input light while maintaining the polarization planes of the same; and
a sixth polarization maintaining fiber having a geometrical center axis disposed on an extension line of the geometrical center axis of said third polarization maintaining fiber for transmitting therethrough the extraordinary ray of light originating from the second input light and the ordinary ray of light originating from light outputted from said third polarization maintaining fiber while maintaining the polarization planes of the same.

2. A polarization coupler according to claim 1, wherein said first, second, third, fourth, fifth and sixth polarization maintaining fibers, said rotator and said birefringent plate are all mounted on a substrate.

3. A polarization coupler according to claim 2, wherein said first, second and third polarization fibers are held in a closely contacting relationship on said rotator while said rotator is held in a closely contacting relationship on said birefringent plate, and said birefringent plate is held in a closely contacting relationship with said fourth, fifth and sixth polarization maintaining fibers.

4. A polarization coupler according to claim 3, wherein said first and third polarization maintaining fibers are held in a closely contacting relationship with said second polarization maintaining fiber while said fourth and sixth polarization maintaining fibers are held in a closely contacting relationship with said fifth polarization maintaining coupler.

5. A polarization coupler according to claim 4, wherein some or all of said first to sixth polarization maintaining fibers are each formed from a birefringent fiber which is different between a propagation coefficient for light of the $HE_x$ mode and a propagation coefficient for light of the $HE_y$ mode.

6. A polarization coupler according to claim 5, wherein said birefringent fiber is of the stress inducing type which has a cross section in which a pair of stress applying portions are provided in a symmetrical relationship on the opposite sides in a clad of a core.

7. A polarization coupler according to claim 5, wherein said birefringent fiber is of the stress inducing type which has a cross section in which an elliptical stress applying portion is provided in a clad around a core.

8. A polarization coupler according to claim 1, wherein the predetermined angle is set such that the power of the extraordinary ray of light which is transmitted through said fifth polarization maintaining fiber may be higher than the power of the ordinary ray of light which is transmitted through said fourth polarization maintaining fiber and the power of the ordinary ray of light which is transmitted through said fifth polarization maintaining fiber may be higher than the power of the extraordinary ray of light which is transmitted through said sixth polarization maintaining fiber.

9. A polarization coupler according to claim 8, wherein said rotator is formed from a half-wave plate, and setting of the predetermined angle is effected by setting of the orientation of an optical axis of said half-wave plate.

10. A polarization coupler according to claim 8, wherein said rotator is formed from a Faraday rotator to which a predetermined magnetic field is applied, and setting of the predetermined angle is effected by setting of the predetermined magnetic field.

11. A process of producing a polarization coupler, comprising:
a first step of mounting a first mother fiber which is to later make first and fourth polarization maintaining fibers, a second mother fiber which is to make second and fifth polarization maintaining fibers and a third mother fiber which is to make third and sixth polarization maintaining fibers onto a substrate such that the maintaining polarization planes of said first to third mother fibers may extend in parallel or perpendicularly to each other and said first to third mother fibers may extend in parallel to each other;
a second step of cutting said first to third mother fibers mounted on said substrate with a predetermined cutting width such that the cutting faces thereof may be positioned in the same plane, thereby dividing said first mother fiber into the first and fourth polarization maintaining fibers, said second mother fiber into the second and fifth polarization maintaining fibers and said third mother fiber into the third and sixth polarization maintaining fibers;
a third step of inserting a rotator and a birefringent plate between said first, second and third polarization maintaining fibers and said fourth, fifth and sixth polarization maintaining fibers such that said rotator may be positioned adjacent said first, second and third polarization maintaining fibers; and a fourth step of connecting said third polarization maintaining fiber and said fourth polarization maintaining fiber to each other such that the maintaining polarization planes thereof may extend in parallel or perpendicularly to each other.

* * * * *

UNITED STATES PATENT AND TRADEMARK OFFICE
CERTIFICATE OF CORRECTION

PATENT NO.  : 5,015,055
DATED       : May 14, 1991
INVENTOR(S) : Takamatsu, et. al.

It is certified that error appears in the above-identified patent and that said Letters Patent is hereby corrected as shown below:

Col. 5, line 49, "fist" should be --first--.

Col. 9, line 60, after "polarization" insert
        --maintaining--.

Signed and Sealed this

Fifteenth Day of December, 1992

Attest:

DOUGLAS B. COMER

*Attesting Officer*    Acting Commissioner of Patents and Trademarks